Figure 1:
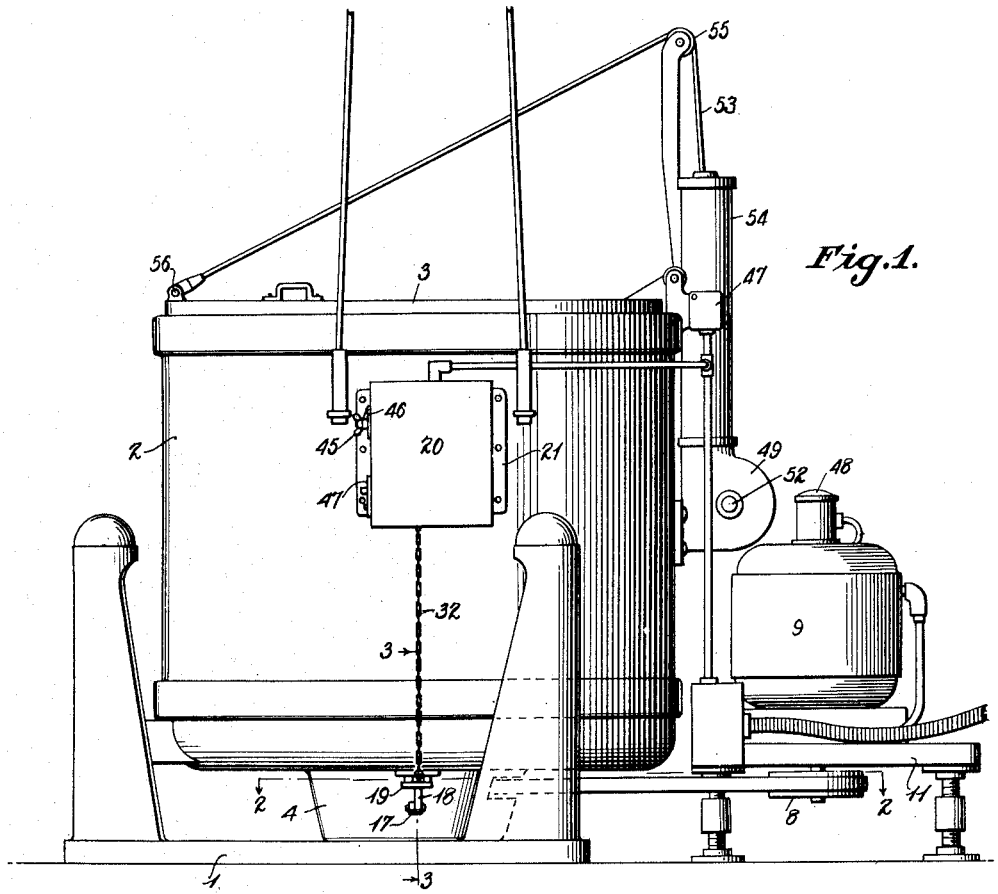

July 5, 1932.  E. J. PERRY  1,865,584
CONTROL SYSTEM AND MECHANISM
Filed Sept. 21, 1927   3 Sheets-Sheet 1

INVENTOR.
Emanuel J. Perry
BY
ATTORNEYS

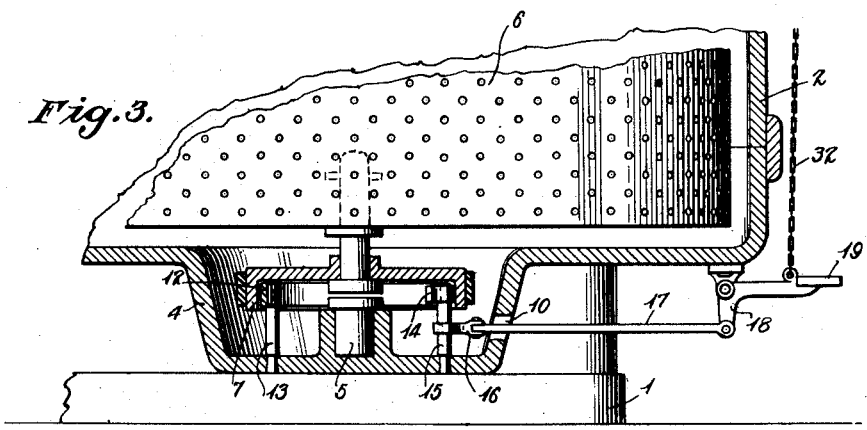
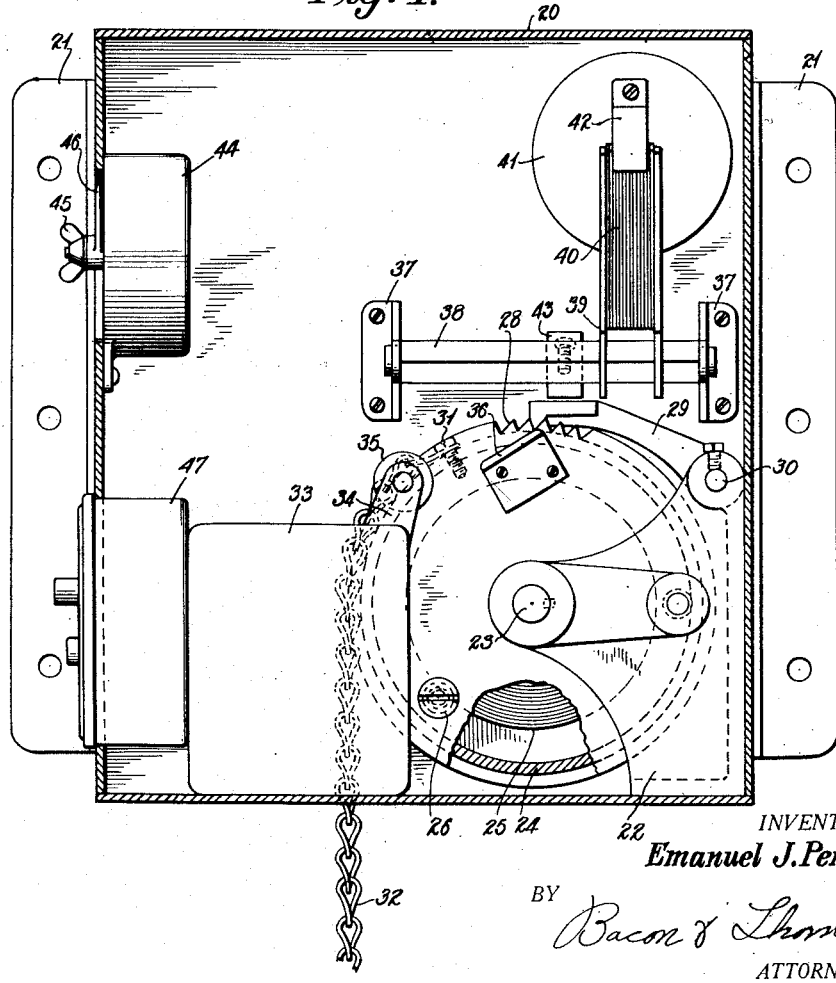

July 5, 1932.  E. J. PERRY  1,865,584
CONTROL SYSTEM AND MECHANISM
Filed Sept. 21, 1927    3 Sheets-Sheet 3
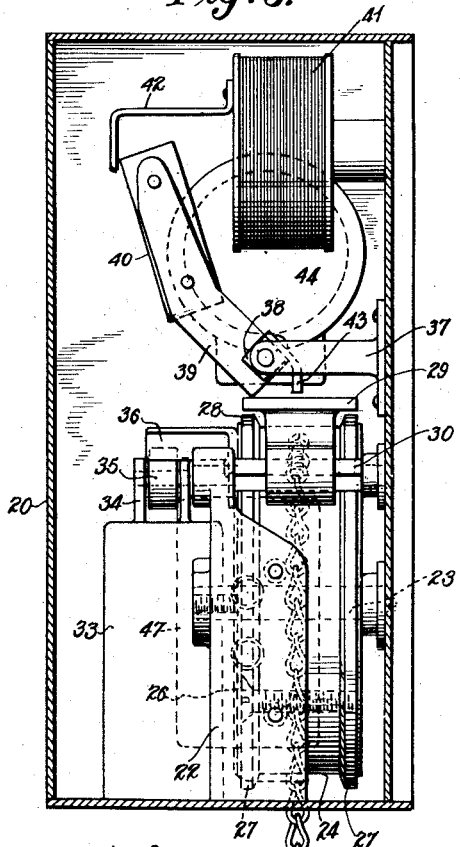
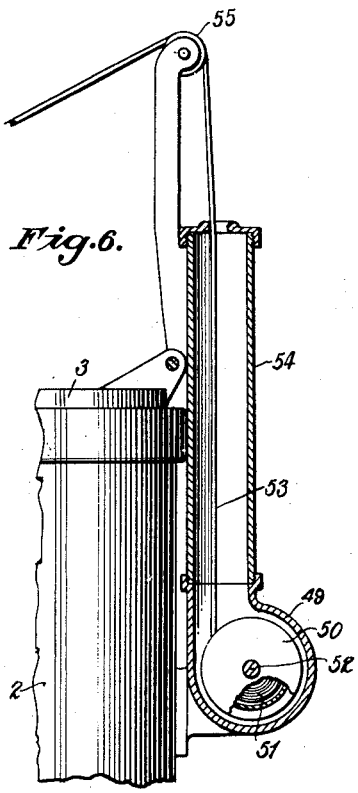
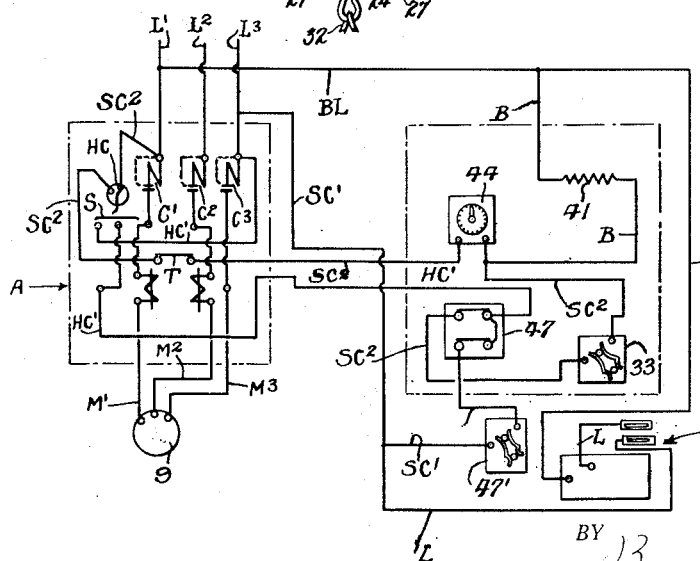
INVENTOR.
Emanuel J. Perry
BY
Bacon & Thomas
ATTORNEYS Patented July 5, 1932

1,865,584

UNITED STATES PATENT OFFICE

EMANUEL J. PERRY, OF NEW BEDFORD, MASSACHUSETTS, ASSIGNOR, BY MESNE ASSIGNMENTS, TO THE AMERICAN LAUNDRY MACHINERY COMPANY, OF NORWOOD, OHIO, A CORPORATION OF OHIO

CONTROL SYSTEM AND MECHANISM

Application filed September 21, 1927. Serial No. 221,108.

My invention relates to a control system and mechanism adapted for use with the various types of power driven machinery wherein it is desirable to automatically control the starting, the stopping and the duration of the work performing period. My invention further embraces certain safety features cooperatively related to the control system proper, all of which will be hereinafter more particularly described.

While obviously of quite general application, my invention is particularly adapted to use in connection with laundry machinery, it being particularly desirable in this class of machinery to have the various functions of the machine performed safely, automatically and in a predeterminable manner. The well known centrifugal extractor affords an excellent example of one type of laundry machine to which my present invention can be most advantageously applied and I have therefore chosen to illustrate my invention in the accompanying drawings as applied to the machine of this character.

It is an object of my invention to provide a control system for power driven machinery whereby to automatically interrupt or discontinue the flow of power and positively stop the machine at the expiration of any desired work performing period, the duration of which period may be predetermined at will.

A further object of my invention resides in a control system and mechanism applied to a centrifugal extractor whereby at the expiration of a work performing period of predetermined duration, the circuit of the driving motor will be interrupted and a brake automatically applied to the extractor for positively stopping the latter.

Another object relates to means associated with the motor starting and brake operating means whereby the latter must be moved to inoperative or released position before the motor can be started.

A still further object resides in the provision of means whereby the extractor cover must be closed before the driving motor can be started and also whereby said cover cannot be opened until said motor has come substantially to a stop.

A further object relates to the provision of means for automatically raising the extractor cover after it has been unlocked and for counter-balancing or compensating for the weight of the cover.

Further objects relate to details of construction, design and arrangement of elements, all of which are hereinafter described and particularly pointed out.

Figure 2:
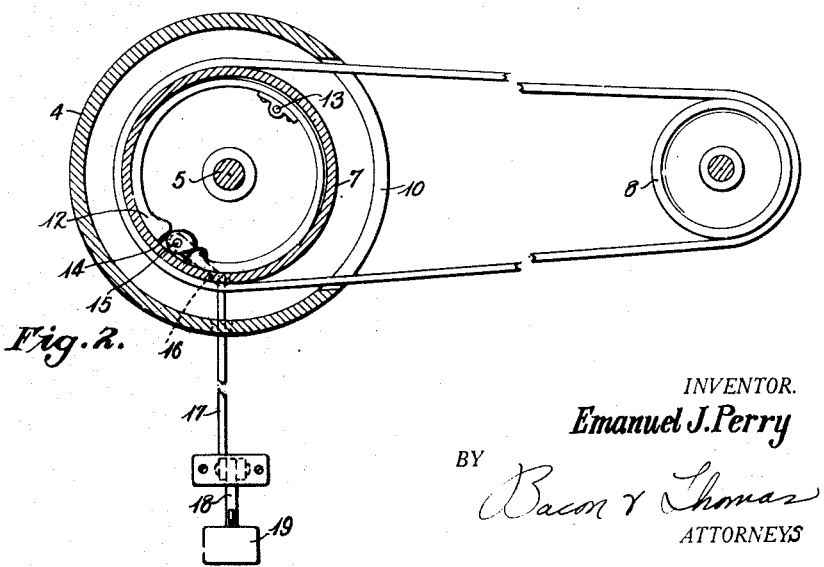

A conventional type of centrifugal extractor having combined therewith the various features outlined above is illustrated in the accompanying drawings wherein:

Fig. 1 is a view in side elevation showing the entire assembly embodying my invention, Fig. 2 is a sectional plan view on the line 2—2 of Fig. 1, Fig. 3 is a view in vertical section of a portion of the mechanism illustrated in Fig. 1 and taken substantially on the line 3—3 of Fig. 1, Fig. 4 is a side elevation of the control unit with the cover thereof removed in order to illustrate the component parts thereof, Fig. 5 is a transverse sectional view taken substantially on the line 5—5 of Fig. 4, Fig. 6 is a view partly in elevation and partly in vertical section illustrating my improved form of cover operating mechanism, and Fig. 7 is a diagrammatic view illustrating the circuit connections of the motor and the various control units of my invention.

Referring now to the drawings and particularly to Figs. 1 and 2, there is illustrated a base member 1 which serves as a support for the centrifugal extractor 2. This extractor is of a well known type and is herein illustrated only to a sufficient extent to clearly show the relationship of my improved control mechanism thereto. The opening in the top of the extractor 2 is provided with the usual hinged cover 3 having its hinged connection located at one side of the machine. The casing of the extractor is provided with a depressed portion 4 wherein is journaled a spindle 5 of the extractor basket 6. Located within this depressed portion of the casing and secured to the spindle 5 is a driving pulley 7 which is adapted to be driven by a belt or other suitable means from the pulley 8 of an electric or other type of motor 9. The motor is mounted on a support 11 which is preferably vertically adjustable in order to properly align the driving and driven pulleys 7 and 8 respectively. The structure thus far described is understood to be of a conventional nature and for this reason it will be appreciated that the details thereof are in no way essential to my invention.

Referring now more particularly to Figs. 2 and 3 of the drawings, it will be seen that the pulley 7 is of an internally hollow formation and that the inner periphery thereof is utilized as a braking surface for controlling the rotation of the extractor basket 6. The particular form of brake which I have chosen for illustration herein is one of the internal expanding type comprising an incomplete circular brake-shoe 12 which is supported independently of the pulley and adapted to be expanded into engagement with the inner peripheral surface thereof. This brake-shoe may be of any preferred structure but as herein shown it is supported at one point in its circumference by a vertically extending spindle 13 which is anchored in the bottom wall of the extractor. The actuating spindle 15 is also journaled in the bottom wall of the extractor casing and at its upper end carries a cam 14 for connection with the adjacent enlarged ends of the brake-shoe 12 for expanding the latter. The actuating spindle 15 is provided with a laterally extending crank arm 16 which is operatively connected to a bell crank lever 18 through the medium of a link 17. A suitable opening 10 is provided in the extractor casing for accommodating the passage therethrough of the brake operating link. The bell crank lever 18 is pivotally supported on a bracket which is secured to the under side of the extractor casing. The other arm of this bell crank lever is provided with a pedal 19 or other suitable form of operating means. It will be seen that a movement of the pedal 19 operates through the link 17 and arm 16 to rock the cam spindle 15, thereby expanding and contracting the brake-shoe 12 with reference to the pulley to stop or release the pulley. In machines of this character it is essential that some efficient form of braking means be provided in order that a heavily loaded extractor basket may be quickly brought to a stop without an undue loss of time. The brake mechanism which I have illustrated and described has been found to serve this purpose in an efficient manner and it will be appreciated that the details of the brake mechanism might be widely varied without in any way affecting the operation of my improved control system and mechanism.

In Fig. 1 of the drawings there is illustrated a control unit 20 which is directly secured to a side wall of the extractor casing and which embodies the more important elements of my control system. The contents of this unit are illustrated more clearly in Fig. 4 of the drawings to which attention is now directed. The various control elements to be hereinafter described are mounted within a substantially rectangular housing which may be constructed of any suitable material. This housing is provided with laterally extending flanges 21 for attachment to the side wall of the extractor casing. Located in the lower right hand corner of this housing is a bracket member 22 in which a spindle 23 is anchored. Rotatably mounted on the spindle 23 is a closed drum-like member 24 within which is housed a spiral spring 25, one end of which spring is secured to the drum as at 26 and the opposite end being anchored to the spindle 23. The periphery of the drum 24 is illustrated as having the form of two spaced peripheral flanges with an intervening flat surface. The flanges which are indicated at 27 in Fig. 5 of the drawings are provided with a series of ratchet teeth 28 for coaction with a gravity actuated pawl 29 mounted on a pivot 30, the purpose of which will be hereinafter set forth. Secured to the drum intermediate the peripheral flanges thereof is a chain or other flexible member 32 which extends downwardly along the side of the extractor casing and has operative connection with the brake operating pedal 19. This chain is secured to the drum by means of a bolt 31 and is therefore constrained to rotate with the drum. Located within the control box 20 and adjacent the spring drum 24 is a safety switch unit 33 of the well known elevator type. A switch actuating arm 34 extends outwardly from the switch box 33 and at its outer end carries a roller 35 which is adapted for engagement with an angle iron 36 suitably mounted and adjusted upon a side face of the drum. The switch within the box 33 is normally open, thus rendering the circuit in which it is included incomplete until the arm 35 is actuated by the projection 36 of the spring drum. It is suggested at this point that the position of the drum 24 at which the projection 36 closes the switch 33 is arranged to correspond to the released position of the extractor brake. The control unit 20 further embodies a switch mechanism 47 comprising two manually operable elements, one for energizing and the other for de-energizing the circuit of the driving motor. Located within the housing 20 and partly projecting from the side wall thereof is a time controlled switch unit 44 of a well known commercial type. This time controlled unit embodies a knob member 45 and an indicator member 46 which coacts with a suitable dial located on the face of the unit for selecting and predetermining the period of energization of the motor circuit. The specific construction of the time controlled switch unit per se forms no part of my invention but is an essential element of my control system. By means of a time controlled unit of this general character, it is possible for the operator to set the system for a work performing period of any desired duration and without further attention the mechanism will operate for the selected period and then automatically come to a stop. The remaining element of control unit 20 is in the form of an electro-magnetic means for governing the action of the drum controlling pawl 29. It will be appreciated that when the spring 25 is energized or wound up, it is necessary that some means be provided for holding the drum in this condition until it is desired to utilize the energy thus stored. The gravity actuated pawl 29 forms a part of this drum controlling mechanism and is in turn adapted to be controlled by the aforementioned electro-magnetic means. Brackets 37 are secured to the rear wall of the control unit housing and in these brackets is rotatably mounted a shaft 38. Secured to this shaft is an actuating arm 43 which is adapted in one position of the shaft to come into engagement with the upper surface of the pawl 29 and force and hold the latter in engagement with the ratchet teeth of the drum. For actuating the shaft 38 I have provided a lever 39 secured to the shaft and carrying a member 40 which is adapted to coact with the electro-magnet 41 in a manner which will be readily understood. A bracket 42 is secured to one face of the electro-magnet for limiting the outward movement of the member 40 as clearly illustrated in Fig. 5. The electro-magnet is so included in the circuit of the driving motor as to be energized when said motor is in operation. It will be apparent that upon energization of the motor circuit, the electro-magnet 41 will likewise be energized and the member 40 immediately actuated in a manner to bring member 43 into locking engagement with the pawl 29. This position exists so long as the motor circuit is energized and release of the pawl 29 is effected immediately upon de-energization of the motor circuit.

I will now briefly describe the operations of the various elements of my control system with particular reference to brake and brake actuating means, the safety switch and the manually and time controlled switches. The first step in the operation of the extractor is necessarily a depression of the brake operating pedal 19 inasmuch as this movement is required for closing the safety switch 33 as above described. The depression of the pedal 19 serves to release the brake 12 and to rotate the spring drum 24 into position to actuate the arm 34 of the safety switch. This rotation of the drum 24 further serves to energize the spring 25 for a subsequent brake setting operation. At this stage of the operation the gravity pawl 29 is in engagement with the ratchet teeth 28 of the drum but is not as yet locked in such an engagement. The time controlled switch unit 44 having been set for a run of a predetermined duration, the operator now depresses the manual starting button of the switch 47 while maintaining the pedal 19 in its depressed position, it being remembered that this position of the pedal and consequently of the drum 24 is essential to the completion of the motor circuit. The switch 33 being closed and the manual starting switch 47 actuated, the circuit of the driving motor is completed and the extractor will begin to operate for the predetermined length of time. Immediately upon the completion of the motor circuit by the closing of the safety switch 33, the manual switch 47 and the time controlled switch 44, the electro-magnet 41 will be energized thus attracting the member 40 and moving the locking element 43 into engagement with the top surface of the drum holding pawl 29. As heretofore pointed out the electro-magnet will remain energized and maintain the pawl in locked engagement with the spring drum so long as the driving motor is energized. During the period of operation of the extractor the spring drum 24 is held in its power storing condition. At the expiration of the predetermined period selected by the operator the motor circuit will be interrupted by the time controlled switch 44 and this interruption of the motor circuit will operate to de-energize the electro-magnet 41, thus rocking the locking member 43 out of engagement with the pawl and permitting the stored energy of the spring to exert itself and quickly and forcefully apply the expanding brake to the extractor pulley. It will be appreciated that these various operations are automatically performed in such a close sequence as to be substantially simultaneous and that for this reason a minimum amount of time is consumed in the starting and stopping of the extractor basket.

In order to conform my improved control system to the safety laws of the various States I have provided a means whereby the extractor cover must be in closed position before the motor can be started and also whereby this cover is locked in such closed position during the operation of the motor. The particular structure of the lock and switch units employed in this portion of my control system forms no part of my invention. My invention as to this feature, however, resides in the arrangement and manner in which these commercial units are employed. In Fig. 1 of the drawings I have illustrated diagrammatically at 47a a conventional type of combined switch and lock structure which has been found to satisfactorily serve the purpose above stated. The switch portion of this structure is so designed as to be actuated by the cover 3 of the extractor in a manner to allow the switch to close when the cover 3 is closed but insuring the opening of the switch when the cover 3 is open. The lock for maintaining the cover 3 in closed position during operation of the motor is a commercial type of magnetic lock and as herein illustrated is adapted to be actuated by a mercury switch 48 located on the motor spindle. By means of this switch the lock is maintained in locking position during the entire period of operation of the motor and is released or de-energized only upon the motor coming to a substantially complete stop. The mercury switch 48 is of a well known commercial type and per se forms no part of my invention. By means of this combined lock and switch structure and the relationship in which it is employed it is apparent that there is no possibility of an operator being injured by reason of getting into contact with the extractor basket while it is in operation.

A further feature of my invention which is of particular importance when associated with the control mechanism described above is illustrated in Fig. 6 of the drawings. I have found it advisable and extremely advantageous to employ some form of automatic power means for opening or raising the hinged cover 3 on machines with which my improved safety switch and lock mechanism is employed. This means is herein shown as in the form of a spring motor 50 located in a housing 49 at the rear of the extractor and operatively connected through the flexible cable or other suitable means 53 with the extractor cover for operating the latter. A spindle 52 is anchored in the casing 49 and to this spindle one end of a spiral spring is secured, the opposite end being secured to the drum 50 of the motor. The flexible element 53 is adapted to be secured to and wound about the periphery of the drum 50 and this cable extends upwardly through a cylindrical extension 54 of the casing. An upwardly extending bracket is provided at the rear of the extractor and a pulley 55 is mounted on this bracket for receiving and guiding the flexible element, which element is connected at its far end to the cover 3 as indicated at 56. By virtue of this construction the cover is automatically and quickly brought to open position immediately upon the release of the magnetic speed controlled lock 47.

The relationship of the various units of my control system can be more readily appreciated from an inspection of the diagrammatic view of the various units and their circuit connections in Fig. 7. In this figure the reference characters $L^1$, $L^2$ and $L^3$ designate the three power lines leading from any suitable source to a commercial form of switchboard designated in its entirety by the reference character A and embodying an automatic starter with a thermal overload relay.

The reference character 41 is employed to designate the electro-magnet which controls the spring drum through the medium of the pawl. The time controlled switch unit or "tork timer" as it is commercially known, is indicated by the reference character 44. At 47 is shown the manually operable starting and stopping switches for the motor circuit. The device diagrammatically shown and represented by the reference character 33 is intended to represent an elevator type of safety switch which is employed as a safety switch in the motor circuit requiring the complete release of the brake before such circuit can be energized. The switch which is actuated by the cover of the extractor is designated on the diagram by the reference character 47a, the purpose of this switch as above described, being to prevent the starting of the motor until the extractor cover has been moved to closed position. The magnetic lock for the extractor cover is represented on the diagram by the reference character 48 and is controlled by a mercury switch. The driving motor is illustrated at 9.

It will be noted by inspecting Figure 7 that three main supply lines $L^1$, $L^2$ and $L^3$ extend to the switchboard designated in its entirety by the reference character A. These three supply lines are connected to one side of three sets of contact elements $C^1$, $C^2$ and $C^3$ which constitute the main circuit making and breaking switch for the motor 9. This motor is connected to these three sets of contacts by means of the motor lines $M^1$, $M^2$ and $M^3$. A holding coil HC is employed for closing and holding the switch formed by the three contacts $C^1$, $C^2$ and $C^3$. This main motor switch is initially actuated or closed by a starting circuit and is then maintained in its closed position by a holding circuit. The starting circuit includes the wire $SC^1$ which is connected to the main line $L^3$ and extends to one side of the safety cover switch 47a. This line then leads from the other side of this switch to the starting and stopping switch 47 to be connected to one terminal of this latter switch. The starting circuit further includes a line $SC^2$ which extends from a different terminal of the switch 47 to one side of the safety brake switch 33 and from the other side of this latter switch to one terminal of the time-controlled circuit making and breaking member 44. This line $SC^2$ then extends from the second terminal of the switch 44 to one terminal of the thermal element T and from the second terminal of this element to one terminal of the holding coil HC. The completion of the circuit is through another portion of the line $SC^2$ which extends between the second terminal of the holding coil HC to the main line $L^1$. To complete this starting circuit, the two safety switches 33 and 47a must be closed and the time-controlled switch 44 must be set to close the circuit at this point. The circuit then remains open only at the starting and stopping switch 47. Upon closing this switch by pushing the starting button, a complete circuit is established through the holding coil HC which actuates the main motor switch by closing the contacts $C^1$, $C^2$ and $C^3$. The energization of the holding coil HC further actuates the switch blade S for causing it to bridge its two contacts. The closing of this starting circuit would have to be maintained by the person actuating the starting switch button if it were not for the provision of a holding circuit. This latter circuit will be described as follows: The line $HC^1$ extends from the main line $L^3$ to one of the terminals of the switch S and from the other terminal of this switch through the line $HC^1$ to one terminal of the starting and stopping switch 47. The other side of this holding circuit is completed by the starting circuit line $SC^2$ which includes the safety switch 33, the time-controlled switch 44, the thermal element T, and the holding coil HC. This holding circuit maintains the holding coil HC energized until the holding circuit is broken. The time-controlled switch 44 functions to break this holding circuit.

The coil 41 is employed to maintain the gravity latch 29 in its position for holding the brake-actuating spring motor against applying the brake. The circuit for this coil 41 includes the line BL which is connected to the main line $L^1$ and the line B which completes the circuit through the coil 41 from the line BL to the common starting circuit and holding circuit line $SC^2$. The elements designated in their entirety by the reference character 48 consist of a mercury switch closed by the rotation of the motor shaft and a magnetic lock switch for holding the extractor cover locked in its closed position. The circuit for the lock switch and the mercury switch includes the line L which extends from the line BL to the starting circuit line $SC^1$. The connection between the line L and the starting circuit line $SC^1$ occurs prior to the inclusion of any of the controlled switches in this latter line and for this reason the opening of the starting circuit by releasing the starting switch button will not affect the circuit through the line L.

When it is desired to start the motor 9, the safety switches 33 and $47^a$ should be closed by the releasing of the brake and the closing of the lid or cover 3. The time-controlled switch 44 then should be set to stop the extractor after the elapse of any desired predetermined interval. The motor 9 then can be started by pushing the starter button of the switch 47. It is believed to be unnecessary to again trace the starting circuit. The holding coil HC is included in the starting circuit and actuates the switch formed by the contacts $C^1$, $C^2$ and $C^3$ for closing the circuit between the main lines $L^1$, $L^2$ and $L^3$ and the motor lines $M^1$, $M^2$ and $M^3$. The energizing of the holding coil HC also closes the holding circuit which includes the time-controlled switch 44. This holding circuit need not be described again as it has been completely traced above. When the time-controlled switch 44 operates to break the circuit, the holding coil HC is de-energized and the connections to the motor 9 are broken by the operation of the contacts $C^1$, $C^2$ and $C^3$. It now is believed that any one skilled in the art will have a complete understanding of the circuits disclosed in Figure 7.

It is desired to again draw attention to the fact that the essential features of the control system herein described as well as the system in its entirety are applicable to a wide variety of machines other than those of the class herein specifically mentioned. The invention is obviously applicable to any rotary work performing machine in which it is desired to predetermine the duration of the work performing period and to automatically interrupt the driving power and bring the working element positively to a stop at the expiration of the selected period. The illustration herein of a centrifugal extractor is made largely for the sake of convenience and it should be understood that it is intended that the present disclosure typifies the analogous types of laundry machinery to which my invention might be applied. I would also call attention to the fact that the structural details of the extractor itself as well as the details of construction of portions of the control mechanism are not regarded as being essential to the invention. Many variations might be made in the construction of the extractor, its driving connections and the brake mechanism without sacrificing the advantages of my invention or departing from the spirit thereof. In other words, the present disclosure is but one form in which my invention might be embodied and it is apparent, therefore, that the scope of my invention is not to be regarded as limited by the disclosure or otherwise than by the limitations contained in the appended claims.

What I claim is:

1. The combination with a rotary work performing member, of an electric motor for driving said member, a brake for stopping said member, a manual starting switch for energizing the motor circuit, a manual stopping switch for de-energizing said circuit, a time controlled switch in said circuit for de-energizing the same at the expiration of selected periods of predetermined duration, a normally open safety switch in said circuit, means operative upon release of said brake for closing the last mentioned switch and power means operative upon de-energization of said circuit for forcibly applying said brake to quickly stop said member.

2. The combination with a rotary work performing member, of an electric motor for driving said member, a brake for stopping said member, a manual starting switch for energizing the motor circuit, a manual stopping switch for de-energizing said circuit, a time controlled switch in said circuit for de-energizing the same at the expiration of selected periods of predetermined duration, a normally open safety switch in said circuit, means operative upon release of said brake for closing the last mentioned switch and means operative upon de-energization of said circuit by either said manual switch or said time controlled switch for applying said brake and simultaneously opening said safety switch.

3. The combination with a rotary work performing member, of a motor for driving said member, a brake for stopping said member, power means for applying said brake, manual means for releasing said brake and energizing said power means, an electric controlled latch operative during and relying upon energization of said motor for holding said power means in energized condition and operative upon de-energization of said motor for releasing said power means, whereby said brake is automatically applied upon de-energization of said motor.

4. The combination with a work performing unit, of a motor for driving said unit, a brake for stopping said unit, a spring for applying said brake, manual means for releasing said brake and energizing said spring and an electric controlled latch in the circuit of said motor for holding said spring in energized condition and with the brake released while said motor circuit is energized and operative upon de-energization of said circuit to release said spring, whereby said brake is automatically applied.

5. In a machine of the character set forth, the combination with a rotary work performing unit, of a prime mover for driving said unit and a means for controlling the operation of the prime mover and the rotation of the said unit, said means including a brake for the unit, a manually operable starting control and stopping switch for controlling the circuit to the prime mover, a power operated switch for controlling the circuit to the prime mover, and power means for operating the last mentioned switch, said power means including a motor, and a time-controlled circuit for determining the period at which the motor is rendered active.

6. In a machine of the character set forth, the combination with a rotary work performing member, of a prime mover for rotating said member, manually operable stopping partial starting control and switch mechanism for the prime mover, a safety switch for stopping and partially controlling starting of the prime mover, and power means for automatically operating the safety switch, said power means including a motor, gravity-operated means for controlling the action of the motor, electromagnetic means for controlling the operation of the gravity-operated means, and a time-controlled switch for controlling the operation of the electromagnetic means.

In testimony whereof I affix my signature.
EMANUEL J. PERRY.